(12) United States Patent
Izumi et al.

(10) Patent No.: US 7,476,466 B2
(45) Date of Patent: Jan. 13, 2009

(54) ALKALINE DRY BATTERY WITH A NICKEL OXYHYDROXIDE AND MANGANESE OXIDE POSITIVE ELECTRODE INCLUDING A CALCIUM COMPOUND

(75) Inventors: Hidekatsu Izumi, Osaka (JP); Tadaya Okada, Osaka (JP); Yasuo Mukai, Osaka (JP); Michiko Fujiwara, Osaka (JP); Shigeto Noya, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/885,663

(22) PCT Filed: Sep. 22, 2006

(86) PCT No.: PCT/JP2006/318883

§ 371 (c)(1),
(2), (4) Date: Sep. 5, 2007

(87) PCT Pub. No.: WO2007/037181

PCT Pub. Date: Apr. 5, 2007

(65) Prior Publication Data

US 2008/0138711 A1 Jun. 12, 2008

(30) Foreign Application Priority Data

Sep. 27, 2005 (JP) ............................. 2005-279704

(51) Int. Cl.
*H01M 4/42* (2006.01)
*H01M 4/52* (2006.01)
*H01M 4/50* (2006.01)
(52) U.S. Cl. ..................... 429/229; 429/223; 429/224
(58) Field of Classification Search ................ 429/223, 429/224, 229
See application file for complete search history.

(56) References Cited

U.S. PATENT DOCUMENTS 6,566,009 B1 * 5/2003 Noya et al. ............... 429/223

(Continued)

FOREIGN PATENT DOCUMENTS

EP 1 408 567 A1 4/2004

(Continued)

*Primary Examiner*—Mark Ruthkosky
(74) *Attorney, Agent, or Firm*—McDermott Will & Emery LLP

(57) ABSTRACT

Provided is an alkaline dry battery allowing suppression of polarization in pulse discharge under heavy load to improve discharge characteristics, and having high reliability in safety in case of short circuit. In the positive electrode, a calcium compound having a content of iron element of 150 ppm or less is added in an amount of 0.1 to 10 mol % with respect to a positive electrode active material, a nickel oxyhydroxide powder having 2.95 or more of an average nickel valence and 8 to 18 μm of an average particle diameter is used, the weight ratio of the nickel oxyhydroxide powder and a manganese dioxide powder is in the range of 20:80 to 90:10. A zinc or zinc alloy powder used as negative electrode active material includes a first powder having a particle diameter more than 75 μm and 425 μm or less, and a second powder having a particle diameter more than 5 μm and 75 μm or less, and the weight ratio of the first powder and the second powder is in the range of 65:35 to 75:25, and the concentration of a potassium hydroxide solution is 33 to 35% by weight.

3 Claims, 2 Drawing Sheets

U.S. PATENT DOCUMENTS

| | | |
|---|---|---|
| 7,244,529 B2 * | 7/2007 | Fujiwara et al. ............. 429/229 |
| 2004/0166411 A1 | 8/2004 | Fujiwara et al. |

FOREIGN PATENT DOCUMENTS

| | | |
|---|---|---|
| JP | 10-40902 | 2/1998 |
| JP | 2000-48827 | 2/2000 |
| JP | 2001-15106 | 1/2001 |
| JP | 2003-17079 | 1/2003 |
| JP | 2003-151539 | 5/2003 |
| JP | 2003-234107 | 8/2003 |
| JP | 2005-71991 | 3/2005 |
| WO | WO 00/21151 A1 | 4/2000 |
| WO | WO 2005/015666 A1 | 2/2005 |

* cited by examiner

ALKALINE DRY BATTERY WITH A NICKEL OXYHYDROXIDE AND MANGANESE OXIDE POSITIVE ELECTRODE INCLUDING A CALCIUM COMPOUND

RELATED APPLICATIONS

This application is the U.S. National Phase under 35 U.S.C. §371 of International Application No. PCT/JP2006/318883, filed on Sep. 22, 2006, which in turn claims the benefit of Japanese Application No. 2005-279704, filed on Sep. 27, 2005, the disclosures of which Applications are incorporated by reference herein.

TECHNICAL FIELD

The present invention relates to an alkaline dry battery including a nickel oxyhydroxide powder and a manganese dioxide powder as positive electrode active materials.

BACKGROUND ART

Alkaline dry batteries have an inside-out structure. A hollow cylindrical positive electrode mixture is disposed in a positive electrode case serving also as a positive electrode terminal, so as to closely contact with the positive electrode case. A gelled negative electrode is disposed in the center of the positive electrode mixture with a separator interposed therebetween. With widespread proliferation of digital devices in recent years, the load power of the devices using batteries as a power supply thereof has been gradually increasing. And therefore, there have been demanded batteries having excellent discharge characteristics under heavy load. In order to respond to such demands, Patent Document 1 proposes mixing a nickel oxyhydroxide powder to a positive electrode mixture. Batteries including nickel oxyhydroxide in the positive electrode have excellent discharge characteristics under heavy load, and have resulted in practical use in recent years.

Alkaline dry batteries including a nickel oxyhydroxide powder as a positive electrode active material have more excellent discharge characteristics under heavy load compared with those of conventional alkaline dry batteries. Therefore, the alkaline dry batteries are spreading as a main power supply for digital devices represented by digital cameras. However, digital devices, for example, digital cameras, have various functions such as light emission of stroboscopes, extending and retracting of optical lens, displaying of liquid crystals, and writing of image data to recording media. Accordingly, batteries used as a power supply of the digital devices need to be able to instantaneously supply electric power under heavy load depending on various functions.

In alkaline dry batteries including a nickel oxyhydroxide powder in a positive electrode active material, storage in an environment at high temperature increases the resistance between the positive electrode case and the positive electrode mixture, and also decreases the amount of the dischargeable positive electrode active material. Therefore, the alkaline dry batteries have a problem that their heavy-load discharge characteristics after storage in an environment at high temperature inferior to those of alkaline manganese batteries not including the nickel oxyhydroxide powder. In order to cope with this problem, Patent Document 2 has proposed addition of zinc oxide and calcium oxide to the positive electrode mixture.

Patent Document 1: Japanese Laid-Open Patent publication No. 2000-48827
Patent Document 2: Japanese Laid-Open Patent publication No. 2001-15106

DISCLOSURE OF THE INVENTION

Problem to be Solved by the Invention

In an alkaline dry battery including a nickel oxyhydroxide powder, discharge of the battery forms nickel hydroxide. Since the nickel hydroxide is an insulating material, supply of instantaneous electric power under heavy load becomes impossible with progression of discharge of the battery. As a result, for example, in the case of using a digital camera, power supply of the camera may be suddenly turned off while in use. That is, in alkaline dry batteries including nickel oxyhydroxide, polarization in a pulse discharge under heavy load becomes larger in the last stage of discharge, thereby resulting in occurrence of a problem of unexpected turning off of power supply.

Furthermore, calcium oxide that has been proposed to be added to a positive electrode mixture in the above-mentioned Patent Document 2 includes a large amount of incorporated impurities, such as iron element that originates in raw materials and in producing process of the calcium oxide and promotes corrosion of a zinc alloy powder. Therefore, long-term storage at ordinary temperatures reduces liquid leakage resistance of the battery. There are also problems of rise of battery temperature etc., in short circuit of the battery.

Therefore, the present invention aims at providing an alkaline dry battery that allows improvement of discharge characteristics by suppression of polarization in pulse discharge under heavy load, and that has high reliability in safety in short circuit of the battery, by optimization of a positive electrode active material powder and additives included in a positive electrode, and of a negative electrode active material powder used for a negative electrode.

Means for Solving the Problem

An alkaline dry battery of the present invention includes:
a positive electrode including a positive electrode active material including a nickel oxyhydroxide powder and a manganese dioxide powder, a conductive agent including graphite, and a calcium compound; and
a negative electrode including a negative electrode active material including a zinc or zinc alloy powder, a gelling agent, and an aqueous solution of potassium hydroxide, wherein
the positive electrode includes the calcium compound having a content of iron element of 150 ppm or less in an amount of 0.1 to 10 mol % with respect to the positive electrode active material,
the nickel oxyhydroxide powder has an average nickel valence of 2.95 or more and an average particle diameter of 8 to 18 μm,
the weight ratio of the nickel oxyhydroxide powder and the manganese dioxide powder is 20:80 to 90:10,
the zinc or zinc alloy powder includes a first powder having a particle diameter more than 75 μm and 425 μm or less, a second powder having a particle diameter more than 5 μm and 75 μm or less, and the weight ratio of the first powder and the second powder is 65:35 to 75:25, and
the concentration of the aqueous solution of potassium hydroxide is 33 to 35% by weight.

The nickel oxyhydroxide powder is preferably obtained by oxidation of a nickel hydroxide powder having a half width of the (101) face of 0.6 to 0.8 deg./2θ, and a half width of the (001) face of 0.5 to 0.7 deg./2θ in a powder X-ray diffraction.

The positive electrode mixture and the negative electrode active material powder having the above described composition may increase the surface area of the negative electrode active material that influences the discharge reaction, and as a result, may suppress the polarization of the negative electrode, leading to improvement in the pulse discharge characteristics under heavy load of the alkaline dry battery.

It is preferred that the calcium compound is a calcium oxide or calcium hydroxide.

Effect of the Invention

According to the present invention, the active material powder and additives included in the positive electrode, and the negative electrode active material powder used for the negative electrode can be optimized. As a result, polarization in the pulse discharge under heavy load can be suppressed, and discharge characteristics can be improved, and an alkaline dry battery having high reliability related with safety in short circuit of the battery can be obtained.

BEST MODE FOR CARRYING OUT THE INVENTION

Figure 1:
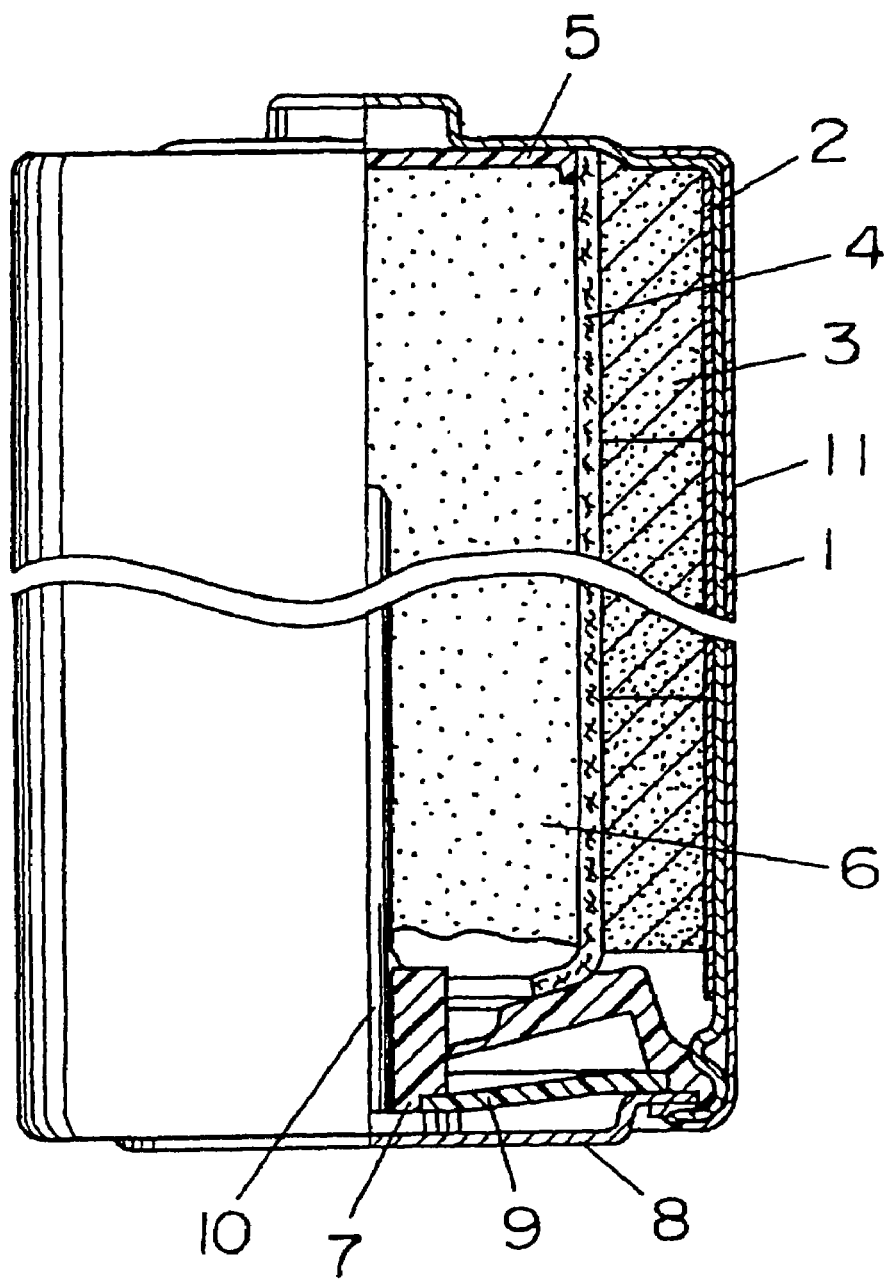
FIG. 1 is a front view, partly in cross section, of an alkaline dry battery according to an embodiment of the present invention.

In order to obtain a suitable nickel oxyhydroxide powder used for alkaline dry batteries for the performance of digital devices, the present inventors have performed investigations, about a nickel oxyhydroxide powder to be used as a positive electrode active material, optimization of the crystallinity of a nickel hydroxide powder that serves as a raw material, based on the premise that the nickel oxyhydroxide powder is obtained by chemical oxidation of a nickel hydroxide having controlled crystallinity for secondary batteries.

Firstly, description will be given about the first powder and the second powder that constitute the negative electrode active material powder in the present invention. The first powder has a particle diameter more than 75 μm and 425 μm or less. The second powder has a particle diameter of 75 μm or less. The particle diameter of the first powder more than 425 μm makes the whole specific surface area smaller, as a result, leading to drop of the reaction efficiency of the negative electrode. Furthermore, the particle diameter of the second powder less than 5 μm excessively raises the reaction efficiency of the negative electrode, and as a result, the temperature rise in short circuit of the battery will increase, disadvantageously resulting in increase of an amount of generated gas in the battery.

When the content of the first powder is less than 65% by weight, that is, when the content of the second powder is more than 35% by weight, the reaction efficiency of the negative electrode will be excessively accelerated. As a result, since the temperature rise in short circuit of the battery increases, the amount of generated gas in the battery increases, leading to deterioration of the liquid leakage resistance of the battery. On the other hand, when the content of the first powder is more than 75% by weight, that is, when the content of the second powder is less than 25% by weight, the whole specific surface area becomes smaller, therefore, resulting in deterioration of the discharge characteristics under heavy load of the battery.

The gas atomizing method may be mentioned as a method for obtaining the above described negative electrode active material powder, for example, a zinc alloy powder. For example, a zinc alloy powder may be obtained by the gas atomizing method as follows.

Firstly, a zinc ingot is melted, and then for example, metals, such as, Bi, In, and Al, to be included in the alloy are added. Next, the molten zinc alloy is flowed down from a nozzle for flowing down, and then compressed air is blown onto the flowed out alloy to obtain a zinc alloy powder.

In the above described process, for example, adjustment of a pressure of compressed air to be blown, and of a distance between the alloy and a blowing off area of the compressed air to be blown out can control the particle diameter of a zinc alloy powder to be obtained. In this way, the first powder and the second powder can be obtained.

For negative electrode, can be used is, for example, a gelled negative electrode. The gelled negative electrode can be obtained by mixing a negative electrode active material powder, an aqueous solution of potassium hydroxide, and a gelling agent, and by gelling the mixture with conventionally publicly known methods.

Conventionally publicly known gelling agents can be used as the gelling agent. For example, sodium polyacrylate may be mentioned.

The concentration of the aqueous solution of potassium hydroxide is preferably 33 to 35% by weight. The concentration 33% by weight or more of the aqueous solution of potassium hydroxide further improves the pulse discharge performance under heavy load. On the other hand, 35% by weight or less of the concentration can suppress diffusion of a reaction product of the negative electrode active material, for example, zinc, in short circuit of the battery, as a result, leading to suppression of the rise of the battery temperature.

The positive electrode preferably includes a calcium compound. The content of the calcium compound 0.1 mol % or more based on a total amount of the positive electrode active material can further improve pulse discharge performance under heavy load. On the other hand, the content of 10 mol % or less maintains the proportion of content of the positive electrode active material in the positive electrode, as a result, resulting in more excellent battery capacity.

Since naturally existing limestone is used as a raw material for the calcium compound, it includes many impurities, such as iron element, based on refining degree in manufacturing stage thereof. Impurities, such as iron element, promote corrosion of the zinc alloy powder, i.e., the negative electrode active material of the battery.

The content of the iron element of 150 ppm or less in the calcium compound can improve the liquid leakage resistance and the safety in short circuit of the battery. The less content of iron element, the better, but the content of 1 to 50 ppm is allowed. The calcium compound in the form of calcium oxide or calcium hydroxide advantageously can give the same effect.

The content of the iron element included in the calcium compound can be measured, for example, by the following methods.

Firstly, water and, for example, hydrochloric acid in an amount of 2 times or more of the equivalent amount are added to the calcium compound, and the mixture was heated to dissolve the calcium compound. When insoluble elements are not observed, the mixture may be measured in a suitable volume without further treatment to obtain a measurement sample. When insoluble elements are observed, the elements are separated with filtration, and the filtrate is measured in a suitable volume to obtain a measurement sample.

Subsequently, the measurement sample is measured for the concentration of Fe by an ICP emission spectrochemical analysis or an atomic absorption spectrometry. Measuring is performed with a calibration curve method or a standard addition method using the same matrix (concentration of hydrochloric acid, calcium). In both methods, used are measurement conditions that are adapted to the apparatus to be used, such as selection of a measurement wavelength and dilution of the specimen. A standard sample for which traceability for Fe can be confirmed is used.

The content of the iron element included in the calcium compound can be calculated, using a concentration of measured Fe, a volume of the measurement sample, and an amount of the calcium compound.

The above described calcium compounds, for example, calcium oxide, may be obtained as follows.

As a raw material, for example, natural limestone (calcium carbonate) with a content of iron element of 110 ppm or less is used. The limestone is introduced into a firing furnace, and carbonate ions are removed by firing at about 1000° C. using heat sources, for example, fuel oil, gas, coal, electricity etc. to obtain a calcium oxide.

Furthermore, calcium hydroxide may also be obtained in such a manner that a fixed amount of calcium oxide and pure water are supplied, for example, to a slaking machine, and slaking(hydration) of calcium oxide is performed by mixing and agitating within a slaking machine. The calcium hydroxide discharged from the slaking machine is supplied into an aging machine. The calcium hydroxide passed through the aging machine, is discharged without slaking unevenness and in the state having uniform adherent moisture. Excessive moisture evaporates in the meantime, and the amount of hydrated water is adjusted so that the calcium hydroxide may hardly have moisture included therein.

Though dependent on the content of iron element in the natural limestone as a raw material, the above-described method can control the content of iron element included in the calcium compound (calcium oxide or calcium hydroxide).

For a positive electrode, for example, nickel oxyhydroxide and manganese dioxide serving as positive electrode active materials, graphite as a conductive agent, the calcium compound, and an electrolyte are mixed in a mixer. Subsequently, the mixture is subjected to particle size regulation to obtain a uniform particle size, and is molded into a hollow cylindrical shape. A positive electrode mixture pellet obtained in this way can be used as a positive electrode.

In the present invention, the positive electrode active material includes nickel oxyhydroxide and manganese dioxide. The nickel oxyhydroxide, can be obtained, for example, in such a manner that a nickel hydroxide powder is introduced in an aqueous solution of sodium hydroxide, a sufficient amount of an aqueous solution of sodium hypochlorite is added, and agitated.

A half width of the (101) face of 0.6 deg./2θ or more of the nickel hydroxide powder in the above-described process facilitates oxidation by sodium hypochlorite etc., thereby, leading to reduction of a proportion of the nickel hydroxide powder included in the nickel oxyhydroxide powder. Here, the nickel hydroxide powder impedes discharge of the nickel oxyhydroxide powder. Accordingly, a smaller proportion of the nickel hydroxide included in the nickel oxyhydroxide provides excellent discharge characteristics under heavy load. On the other hand, a half width of the (101) face 0.8 deg./2θ or less of the nickel hydroxide powder increases the crystal size of the nickel oxyhydroxide powder obtained from the nickel hydroxide powder. Thereby, rapid formation of the nickel hydroxide layer on the whole crystal surface can be suppressed in pulse discharge under heavy load. That is, polarization in pulse discharge under heavy load can be suppressed.

A half width of the (001) face of 0.5 deg./2θ or more of the nickel hydroxide powder facilitates production of the nickel oxyhydroxide powder having a particle diameter of 8 μm or more, and preferably improves the filling property of the nickel oxyhydroxide in the positive electrode. On the other hand, a half width of the (001) face of 0.7 deg./2θ or less of the nickel hydroxide powder improves the crystal orientation of the nickel hydroxide. Accordingly, use in the battery of the nickel oxyhydroxide powder obtained improves close contact with graphite etc. in the positive electrode. Therefore, excellent discharge characteristics under heavy load especially after storage of the battery can be realized.

Nickel hydroxide can be obtained, for example, as follows.

Firstly, an aqueous solution of nickel sulfate, an aqueous solution of sodium hydroxide, and an ammonia water are mixed to prepare a suspension, and then the suspension is agitated. Nickel hydroxide may be obtained by separation of the precipitate by decantation from this suspension. In a process of obtaining the nickel hydroxide powder, the half width of the (101) face and the (001) face of the nickel hydroxide powder is dependent on the concentration of the aqueous solution of sodium hydroxide, and the concentration of the ammonia water.

An average nickel valence of 2.95 or more of the nickel oxyhydroxide powder decreases, as a result, a proportion of the nickel hydroxide powder included in the nickel oxyhydroxide powder, leading to excellent discharge characteristics under heavy load. An average nickel valence of 3.00 to 3.05 further decreases the proportion of the nickel hydroxide powder included in the nickel oxyhydroxide powder, advantageously providing stable discharge characteristics of the battery having smaller variation. In the process of obtaining the above-described nickel oxyhydroxide, the average nickel valence of the nickel oxyhydroxide is, for example, dependent on an amount of addition of the sodium hypochlorite.

The average nickel valence of the nickel oxyhydroxide can be obtained, for example, as follows.

(a) Measurement of a Weight Ratio of Nickel in a Nickel oxyhydroxide

For example, 0.05 g of a nickel oxyhydroxide powder is added into, for example, 10 $cm^3$ of concentrated nitric acid, then heated and dissolved. Ferther, for example, 10 $cm^3$ of an aqueous solution of tartaric acid and ion exchange water are added thereto, and the total volume is adjusted to 200 $cm^3$. The pH of the solution is adjusted using an ammonia water and acetic acid. For example, 1 g of potassium bromate is added thereto to oxidize cobalt ions etc., which could cause measurement error, to a higher order state. While heating and agitating the solution, an ethanol solution of dimethylglyoxime is added to precipitate nickel (II) ions as a dimethylglyoxime complex compound. Subsequently, the formed precipitate is collected by suction filtration, and, then is dried, for example, in an atmosphere at 110° C. The weight of the precipitate is measured. The weight ratio of nickel included in the active material powder is determined by the following equation.

Weight ratio of Nickel={weight of precipitate (g)× 0.2032}/{sample weight (g) of active material powder}

(b) Measurement of an Average Nickel Valence by oxidation-reduction Titration

For example, 0.2 g of a nickel oxyhydroxide powder, for example, 1 g of potassium iodide and, for example, 25 cm³ of sulfuric acid are mixed, and completely dissolved with agitation. In this process, metal ions having a high valence, that is, nickel ions oxidize the potassium iodide to iodine, and the nickel ions themselves are reduced to divalent nickel. Subsequently, for example, after kept standing for 20 minutes, an aqueous solution of acetic acid-ammonium acetate as a pH buffer solution and ion exchange water are added to terminate the reaction. Iodine formed and separated is titrated, for example, with an aqueous solution of 0.1 mol/l sodium thiosulfate. The titer in this case reflects the amount of the metal ions having larger valence than divalence described above.

Therefore, using the weight ratio of the nickel obtained by (a) and the amount of the metal ions obtained by (b), an average nickel valence included in the nickel oxyhydroxide can be determined.

The average particle diameter of 8 µm or more of the nickel oxyhydroxide powder improves the filling property of the positive electrode mixture as mentioned above, therefore, leading to more excellent discharge characteristics. On the other hand, the average particle diameter of 18 µm or less improves the contacting property with graphite serving as a conductive agent, therefore, resulting in improved discharge characteristics under heavy load in initial stage and after storage in an environment at high temperature.

In the process of producing the above-described nickel hydroxide, the average particle diameter of the nickel oxyhydroxide is dependent on an agitation period of suspension to be adjusted.

The weight ratio of 20:80 to 90:10 of the nickel oxyhydroxide powder and the manganese dioxide powder in the positive electrode mixture can improve discharge characteristics and heavy-load pulse characteristics in initial stage and after storage in an environment at high temperature, and, furthermore, can suppress the temperature rise in short circuit of the battery. Especially, the weight ratio of 20:80 to 60:40 of the nickel oxyhydroxide powder and the manganese dioxide powder in the positive electrode mixture can improve heavy-load pulse characteristics, preferably suppressing the temperature rise in short circuit of the battery.

Conventionally publicly known electrolytes may be used as an electrolyte, for example, an aqueous solution of potassium hydroxide. Also in this case, the same aqueous solution of potassium hydroxide included in the above-described negative electrode may be used.

The concentration of the aqueous solution of potassium hydroxide is preferably 33 to 35% by weight. The concentration of the aqueous solution of potassium hydroxide of 33% by weight or more improves the performance of the pulse discharge under heavy load. On the other hand, the concentration of 35% by weight or less can suppress the temperature rise in short circuit of the battery.

Conventionally publicly known separators can be used as a separator, such as, non-woven fabrics composed of polyvinyl alcohol fiber and rayon.

Here, descriptions about an alkaline dry battery according to one embodiment of the present invention will be given with reference to FIG. 1. The alkaline dry battery has a cylindrical positive electrode mixture pellet 3 and a gelled negative electrode 6 charged in the hollow area thereof. A separator 4 intervenes between the positive electrode and the negative electrode. An interior surface of the positive electrode case 1 has a nickel-plated layer, and a graphite coating film 2 is formed thereon.

Alkaline dry batteries are produced, for example, as follows.

Firstly, a plurality of hollow cylindrical positive electrode mixture pellets 3 are inserted into the positive electrode case 1 and the positive electrode mixture pellets 3 are repressed in the positive electrode case 1. The positive electrode mixture pellets 3 are thus forced to closely contact to the interior surface of the positive electrode case 1. Subsequently, a separator 4 and an insulating cap 5 are disposed in hollow area of the positive electrode mixture pellet 3.

Subsequently, an electrolyte is introduced into the hollow area of the positive electrode mixture pellet 3 in order to wet the separator 4 and the positive electrode mixture pellet 3. The gelled negative electrode 6 is charged inside the separator 4 after introduction of the electrolyte.

Subsequently, a negative electrode current collector 10, which is integrated with a sealing plate 7 made of a resin, a bottom plate 8 serving also as a negative electrode terminal, and an insulating washer 9, is inserted into the gelled negative electrode 6. An open end of the positive electrode case 1 is crimped onto the circumference of the bottom plate 8 with the edge of the resin sealing plate 7 interposed therebetween, in order to seal the opening of the positive electrode case 1. Finally, an outer surface of the positive electrode case 1 is covered with an outer jacket label 11 to obtain an alkaline dry battery.

Hereinafter, examples of the present invention will be described. The aspects of the present invention are not limited to these examples.

EXAMPLE

Experimental Examples

An aqueous solution of 2.4 mol/l nickel sulfate, an aqueous solution of 5 mol/l sodium hydroxide, and 5 mol/l ammonia water were introduced in a reactor. The reactor was provided with an impeller and inside of the reactor was maintained at 40° C. Each aqueous solution was continuously introduced using a pump at a flow rate of 0.5 ml/min. When the pH and the balance between metal salt concentration and the metal hydroxide particle concentration in the reactor gave a constant state to reach a stationary state, a suspension obtained by overflow was collected. A precipitate was separated from the suspension by decantation. The precipitate was treated with alkali using an aqueous solution of sodium hydroxide at pH 13 to 14, and thus anions, such as sulfate ions in the metal hydroxide particles, were removed. Furthermore, washing with water and drying were performed to obtain a nickel hydroxide powder 1. The nickel hydroxide powder 1 had a volume basis average particle diameter of 12.3 µm by a laser diffraction particle size distribution analyzer.

Figure 2:
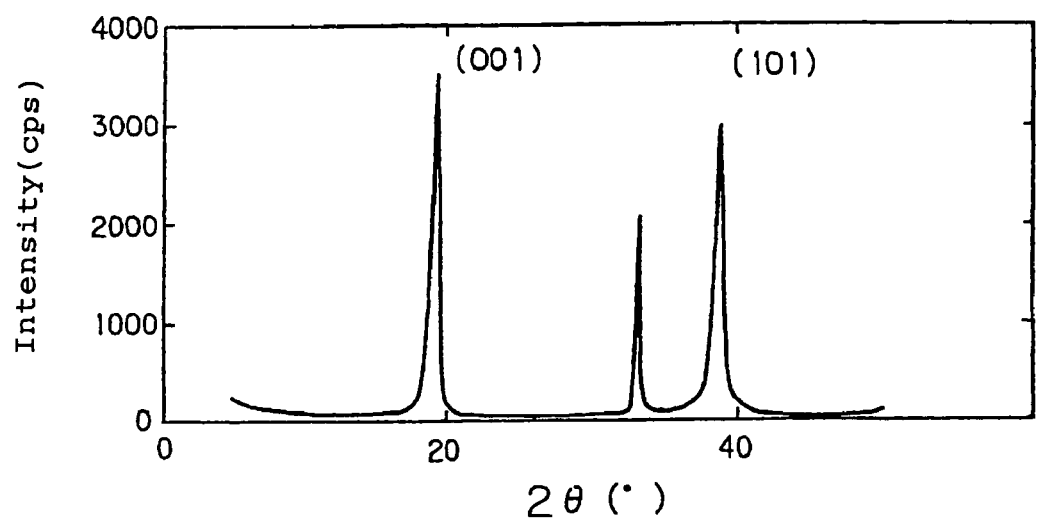
FIG. 2 is a powder X-ray diffraction pattern of a nickel hydroxide powder.

The nickel hydroxide powder was measured for a crystal structure of particles under the following conditions using a powder X-ray diffractometer. FIG. 2 illustrates a powder X-ray diffraction pattern of a typical nickel hydroxide powder.

Measuring apparatus: Powder X-ray diffractometer "RINT1400" product of Rigaku Corporation,
Anticathode: Cu
Filter: Ni
Tube voltage: 40 kV
Tube current: 100 mA
Sampling angle: 0.02 deg.
Scanning rate: 3.0 deg./min.
Divergence slit: ½ deg.
Scattering slit: ½ deg.

The recorded X-ray diffraction pattern using CuK α rays confirmed the β-nickel $(OH)_2$ type single phase. The half width of the peak of the (101) face in the vicinity of 2θ=37 to 40° of the nickel hydroxide was 0.92 deg./2θ. The half width of the peak of the (001) face located in the vicinity of 2θ=18 to 21° was 0.90 deg./2θ. The half widths are effective values, when the crystallinity of the nickel hydroxide powder is controlled in consideration of high rate charge and discharge characteristics of a secondary battery.

In order to obtain a nickel hydroxide powder having different half widths of the (101) face and the (001) face, a nickel hydroxide powder 2 was produced by the same method as in the above-described nickel hydroxide powder 1, except for having varied the concentration of the aqueous solution of sodium hydroxide and the ammonia water. In detail, the concentration of the aqueous solution of sodium hydroxide was set as 4.7 mol/l, and the concentration of the ammonia water as 5.3 mol/l. The nickel hydroxide powder 2 had a half width of a peak of the (101) face of 0.78 deg./2θ, and had a half width of a peak of the (001) face of 0.61 deg./2θ. Furthermore, the volume basis average particle diameter of the nickel hydroxide powder 2 by a laser diffraction particle size distribution analyzer was 11.7 μm.

The nickel hydroxide powder 1 and an aqueous solution of 0.5 mol/l sodium hydroxide were mixed. Furthermore, an aqueous solution of sodium hypochlorite (available chlorine concentration: 12 wt %) was added thereto so as to give an equivalent of oxidizing agent of 1.2. Subsequently, the system was agitated in a reaction atmosphere temperature at 45° C. for 3 hours to prepare a nickel oxyhydroxide powder 1. The obtained nickel oxyhydroxide powder was sufficiently washed with water, and then vacuum dried at 60° C. to obtain a positive electrode active material powder. A nickel oxyhydroxide powder 2 was prepared by the same method as described above except for having used the nickel hydroxide powder 2.

The average nickel valence of the nickel oxyhydroxide powder was calculated by following chemical measurement methods.

(a) Measurement of Weight Ratio of Nickel by Weight Method (dimethylglyoxime Method)

Concentrated nitric acid 10 cm³ was added into 0.05 g of a nickel oxyhydroxide powder, which was heated and dissolved. After adding 10 cm³ of an aqueous solution of tartaric acid thereto, was further added ion exchange water, and the total volume was adjusted to 200 cm³. After adjustment of pH by an ammonia water and acetic acid, 1 g of potassium bromate was added to obtain a mixed solution. Subsequently, an ethanol solution of dimethylglyoxime was added into the mixed solution while heating and agitating to precipitate the nickel (II) ions as a dimethylglyoxime complex compound. After filtration by suction, the formed precipitate was collected, dried in an atmosphere at 110° C., and then the precipitate was measured for a weight. The weight ratio of nickel in the precipitate was calculated by the following equation.

Weight ratio of nickel=[weight of precipitate (g)× 0.2032]/[weight of sample (g) of positive electrode active material powder]

(b) Measurement of an Average Nickel Valence by oxidation-reduction Titration

Potassium iodide 1 g and 25 cm³ Of sulfuric acid were added to 0.2 g of nickel oxyhydroxide powder, and the mixture was sufficiently agitated to completely dissolve the components. After the obtained solution was kept standing for 20 minutes, an aqueous solution of acetic acid-ammonium acetate and ion exchange water were added as a pH buffer solution to terminate the reaction. Formed and separated iodine was titrated with an aqueous solution of 0.1 mol/l sodium thiosulfate. The titer in this case reflects the amount of the metal ions having a valence larger than 2 mentioned above. Then, the average nickel valence of the nickel oxyhydroxide powder was obtained using the weight ratio of nickel obtained by (a) and the amount of metal ions obtained by (b).

Furthermore, as a calcium compound to be included in the positive electrode, calcium hydroxide of analytical grade manufactured by JUNSEI CHEMICAL CO.,LTD. was used. Measurement of the content of iron element by the above-described method gave 21 ppm.

Pellets of positive electrode mixture produced as follows were used for a positive electrode.

Firstly, the nickel oxyhydroxide powder 1, a manganese dioxide powder, graphite, and an electrolyte were mixed at a weight ratio of 50:50:6.5:1. Furthermore, the above-described calcium hydroxide was added so as to give 5 mol % with respect to the total amount of the positive electrode active material. After mixing uniformly with a mixer, the particle size of the mixture was regulated so as to give a fixed particle size to obtain a positive electrode mixture. The positive electrode mixture was compression molded to obtain a hollow cylindrical positive electrode mixture pellet. An aqueous solution of 37% by weight potassium hydroxide was used for the electrolyte.

A non-woven fabric composed of polyvinyl alcohol fiber and rayon fiber was used for a separator.

A gelled negative electrode obtained as follows was used for a negative electrode.

Firstly, a zinc ingot was melted, and bismuth, indium, and aluminum were added in the molten zinc so as to give a following content. Subsequently, this molten zinc alloy was made to flow down from a nozzle for flowing down, compressed air was blown onto the alloy flowed out to produce a zinc alloy powder including bismuth 250 ppm, indium 250 ppm, and aluminum 35 ppm.

A first powder having a particle diameter exceeding 75 μm and 425 μm or less, and a second powder having a particle diameter exceeding 5 μm and 75 μm or less were obtained, by adjustment of the pressure of the compressed air blown in the above described process.

The first powder and the second powder were mixed at a weight ratio of 65:35 to obtain a negative electrode active material powder.

The negative electrode active material powder, an aqueous solution of 37% by weight potassium hydroxide, and a sodium polyacrylate were mixed together, and then a gel was formed in the same manner as the conventional method to obtain a gelled negative electrode.

Subsequently, an alkaline dry battery with a size of AA illustrated in FIG. 1 was produced. FIG. 1 is a front view, partly in cross section, of an alkaline battery according to one embodiment of the present invention. The alkaline dry battery was produced as follows.

A plurality of positive electrode mixture pellets 3 in the of a hollow cylinder were inserted into a positive electrode case 1. The positive electrode mixture pellets were repressed in the positive electrode case 1, so that they were closely contacted with an interior surface of the positive electrode case 1. A separator 4 and an insulating cap 5 were inserted inside the hollow area of the pellet 3 of the positive electrode mixture, and then an electrolyte was poured in. An aqueous solution of 37% by weight potassium hydroxide was used for the electrolyte. The gelled negative electrode 6 was charged inside the separator 4 after pouring of the electrolyte.

Then, a negative electrode current collector 10, which was integrated with a sealing plate 7 made of a resin, a bottom plate 8 serving also as a negative electrode terminal, and an insulating washer 9, was inserted into the gelled negative electrode 6. Subsequently, the open end of the positive electrode case 1 was crimped onto the circumference of the bottom plate 8 with the edge of the sealing plate 7 made of a resin interposed therebetween, and thus the opening of the positive electrode case 1 was sealed. Finally, the outer surface of the positive electrode case 1 was covered with an outer jacket label 11 to obtain an alkaline dry battery (battery 1).

Except for having used aqueous solutions of 35, 33, and 31% by weight potassium hydroxide instead of an aqueous solution of 37% by weight potassium hydroxide, as an electrolyte, batteries 2 to 4 were produced by the same method as in battery 1.

cycles of a pulse of 1.5 W in 2 seconds—0.65 W in 28 seconds was performed for every hour. The number of cycles until the voltage reached 1.05 V, and the voltage drop width at 1.05 V (ΔV) were measured (intermittent discharge performance). Tables 1 to 3 illustrate the average of each ten batteries, wherein the duration of the alkaline dry battery 1 was set as 100.

The batteries were evaluated for temperature rise in the case of compulsory short circuit. In detail, the highest temperature reached in the short circuit of the batteries was measured using a thermocouple. Tables 1 to 3 illustrate the average of the highest temperature reached of each five batteries.

TABLE 1

(1) Study of KOH concentration

| Battery No. | The first powder (% by weight) | The second powder (% by weight) | Half width of (101) face of nickel hydroxide | Half width of (001) face of nickel hydroxide | Average nickel valence | Average particle diameter D50 (μm) | KOH concentration (% by weight) | Intermittent discharge performance Performance index | ΔV value (mV) | Temperature of battery at the time of short circuit (° C.) |
|---|---|---|---|---|---|---|---|---|---|---|
| 1 | 65 | 35 | 0.92 | 0.9 | 2.99 | 12.3 | 37 | 100 | 281 | 201 |
| 2 | 65 | 35 | 0.92 | 0.9 | 2.99 | 12.3 | 35 | 104 | 271 | 189 |
| 3 | 65 | 35 | 0.92 | 0.9 | 2.99 | 12.3 | 33 | 98 | 282 | 179 |
| 4 | 65 | 35 | 0.92 | 0.9 | 2.99 | 12.3 | 31 | 85 | 323 | 162 |

TABLE 2

(2) Study in using the powder of nickel oxyhydroxide 2

| Battery No. | The first powder (% by weight) | The second powder (% by weight) | Half width of (101) face of nickel hydroxide | Half width of (001) face of nickel hydroxide | Average nickel valence | Average particle diameter D50 (μm) | KOH concentration (% by weight) | Intermittent discharge performance Performance index | ΔV value (mV) | Temperature of battery at the time of short circuit (° C.) |
|---|---|---|---|---|---|---|---|---|---|---|
| 5 | 65 | 35 | 0.78 | 0.61 | 3.01 | 11.7 | 37 | 112 | 258 | 173 |
| 6 | 65 | 35 | 0.78 | 0.61 | 3.01 | 11.7 | 35 | 113 | 256 | 146 |
| 7 | 65 | 35 | 0.78 | 0.61 | 3.01 | 11.7 | 33 | 103 | 273 | 138 |
| 8 | 65 | 35 | 0.78 | 0.61 | 3.01 | 11.7 | 31 | 89 | 318 | 120 |

Except for having used the nickel oxyhydroxide powder 2 instead of the nickel oxyhydroxide powder 1, batteries 5 to 8 were produced by the same method as described above.

Except for having set the weight ratio of the first powder and the second powder as 85:15, 75:25, or 55:35 in the negative electrode active material powder, batteries 9 to 11 were produced by the same method as in battery 6.

Except for having set the weight ratio of the first powder and the second powder as 85:15, 75:25, or 55:35 in the negative electrode active material powder, batteries 12 to 14 were produced by the same method as in battery 7.

Evaluation Test

As evaluation for batteries 1 to 14, assuming actual use of a battery in a digital camera, a pulse discharge having 10

As respective comparisons among the batteries 1 to 4 (Table 1) and the batteries 5 to 8 (Table 2) illustrate, the polarization in a pulse discharge under heavy load is more reliably suppressed in the batteries 5 to 8 using nickel oxyhydroxide obtained from nickel hydroxide having a half width of the (101) face of 0.6 to 0.8 deg./2θ, and a half width of the (001) face of 0.5 to 0.7 deg./2θ in a powder X-ray diffraction. Furthermore, the temperature rise in short circuit of the batteries is also more reliably suppressed.

On the other hand, the battery 5 including an aqueous solution of potassium hydroxide as an electrolyte having a concentration exceeding 35% by weight exhibited 173° C. of the highest temperature reached of the battery in short circuit. Furthermore, the battery 8 having a concentration less than 33% by weight of an aqueous solution of potassium hydroxide as an electrolyte exhibits poor pulse discharge characteristics, and the batteries 6 and 7 having a concentration of 33 to 35% by weight of an aqueous solution of potassium hydroxide as an electrolyte provided batteries exhibiting excellent discharge performance and suppression of rise of the battery temperature in short circuit. Accordingly, the results show that the concentration of the aqueous solution of potassium hydroxide as an electrolyte is preferably 33 to 35% by weight.

INDUSTRIAL APPLICABILITY

The alkaline dry battery according to the present invention may be used as a power supply for devices that need improvement in discharge characteristics under heavy load, and improvement in safety.

TABLE 3

(3) Study of weight ratio of the first powder and the second powder, and the concentration of KOH

| Battery No. | The first powder (% by weight) | The second powder (% by weight) | Half width of (101) face of nickel hydroxide | Half width of (001) face of nickel hydroxide | Average nickel valence | Average particle diameter D50 (μm) | KOH concentration (% by weight) | Intermittent discharge performance Performance index | ΔV value (mV) | Temperature of battery at the time of short circuit (° C.) |
|---|---|---|---|---|---|---|---|---|---|---|
| 6  | 65 | 35 | 0.78 | 0.61 | 3.01 | 11.7 | 35 | 113 | 256 | 146 |
| 9  | 85 | 15 | 0.78 | 0.61 | 3.01 | 11.7 | 35 | 92  | 310 | 132 |
| 10 | 75 | 25 | 0.78 | 0.61 | 3.01 | 11.7 | 35 | 107 | 268 | 135 |
| 11 | 55 | 45 | 0.78 | 0.61 | 3.01 | 11.7 | 35 | 120 | 246 | 171 |
| 7  | 65 | 35 | 0.78 | 0.61 | 3.01 | 11.7 | 33 | 103 | 273 | 138 |
| 12 | 85 | 15 | 0.78 | 0.61 | 3.01 | 11.7 | 33 | 92  | 310 | 127 |
| 13 | 75 | 25 | 0.78 | 0.61 | 3.01 | 11.7 | 33 | 107 | 268 | 130 |
| 14 | 55 | 45 | 0.78 | 0.61 | 3.01 | 11.7 | 33 | 109 | 264 | 170 |

The battery 9 and the battery 12 having weight ratios of 85:15 of the first powder and the second powder exhibited poor discharge characteristics. The reason is probably that the batteries have a large polarization at the negative electrode side in pulse discharge under heavy load. Furthermore, the battery 11 and the battery 14 having weight ratios of 55:45 of the first powder and the second powder exhibited a significantly large temperature rise in short circuit of the batteries.

Accordingly, the results show that the weight ratio of the first powder and the second powder in the negative electrode active material is preferably 65:35 to 75:25.

The half width of the (101) face of the nickel hydroxide powder was 0.78 deg./2θ in the example, and a half width in a range of 0.6 to 0.8 deg./2θ provided the same effect.

Furthermore, the half width of the (001) face of the nickel hydroxide powder was 0.61 deg./2θ in the example, and the half width in a range of 0.5 to 0.7 deg./2θ provided the same effect.

The average nickel valence of the nickel oxyhydroxide powder was 3.01 in the example, and 2.95 or more of the average nickel valence provided the same effect.

The average particle diameter of the nickel oxyhydroxide powder was 11.7 μm in the example, and the average particle diameter in a range of 8 to 18 μm provided the same effect.

The weight ratio of the nickel oxyhydroxide and the manganese dioxide was 60:40 in the example, and the weight ratio in a range of 20:80 to 90:10 provided the same effect.

The content of the calcium hydroxide was 5 mol % with respect to the positive electrode active material in the example, and the content in a range of 0.1 to 10 mol % provided the same effect.

Furthermore, the content of iron element in calcium hydroxide was 21 ppm in the example, and the content in a range of 150 ppm or less gave the same effect.

The invention claimed is:

1. An alkaline dry battery comprising:
   a positive electrode including a positive electrode active material comprising a nickel oxyhydroxide powder and a manganese dioxide powder, a conductive agent comprising graphite, and a calcium compound; and
   a negative electrode including a negative electrode active material comprising a zinc or zinc alloy powder, a gelling agent, and an aqueous solution of potassium hydroxide, wherein
   the positive electrode includes a calcium compound having a content of iron element of 150 ppm or less in an amount of 0.1 to 10 mol % with respect to the positive electrode active material,
   the nickel oxyhydroxide powder has an average nickel valence of 2.95 or more and an average particle diameter of 8 to 18 μm,
   the weight ratio of the nickel oxyhydroxide powder and the manganese dioxide powder is 20:80 to 90:10,
   the zinc or zinc alloy powder includes a first powder having a particle diameter more than 75 μm and 425 μm or less, and a second powder having a particle diameter more than 5 μm and 75 μm or less, the weight ratio of the first powder and the second powder is 65:35 to 75:25, and
   the concentration of the aqueous solution of potassium hydroxide is 33 to 35% by weight.

2. The alkaline dry battery according to claim 1, wherein the nickel oxyhydroxide powder is obtained by oxidizing a nickel hydroxide powder having a half width of the (101) face of 0.6 to 0.8 deg./2θ, and a half width of the (001) face of 0.5 to 0.7 deg./2θ in a powder X-ray diffraction.

3. The alkaline dry battery according to claim 1, wherein the calcium compound is a calcium oxide or calcium hydroxide.

* * * * *